Figure 1:
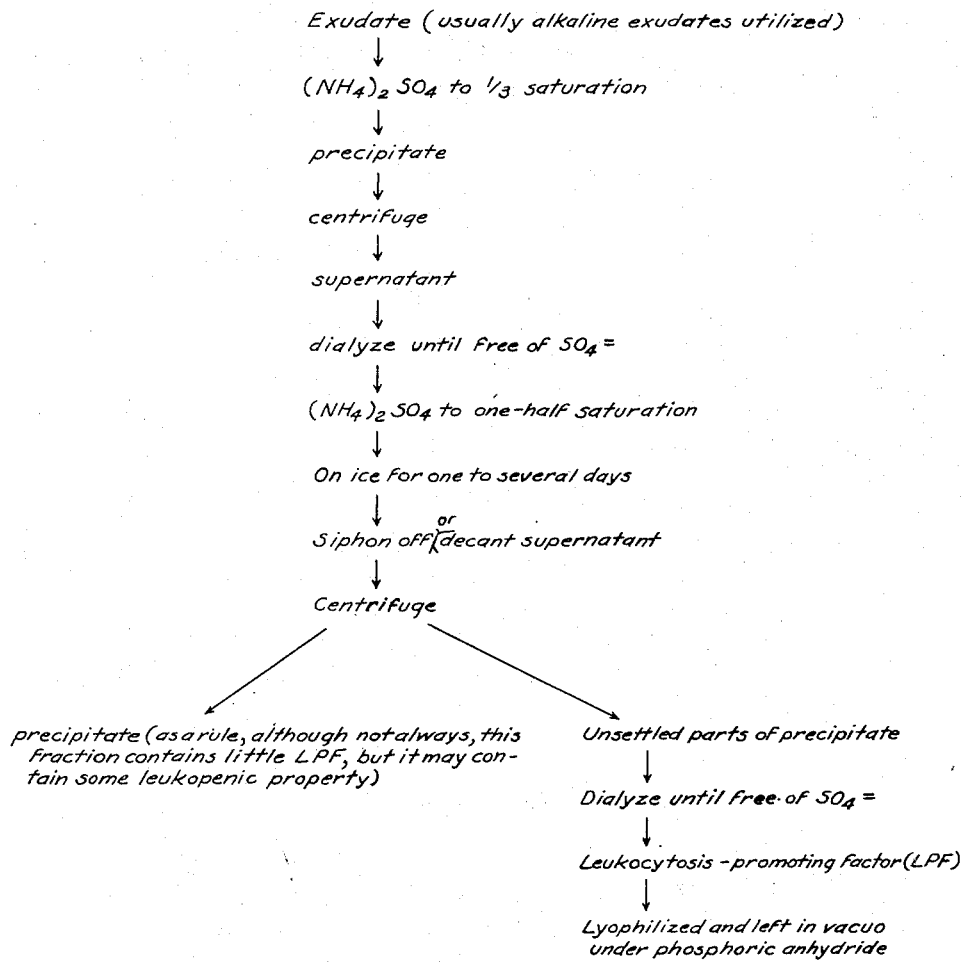
Figure 2:
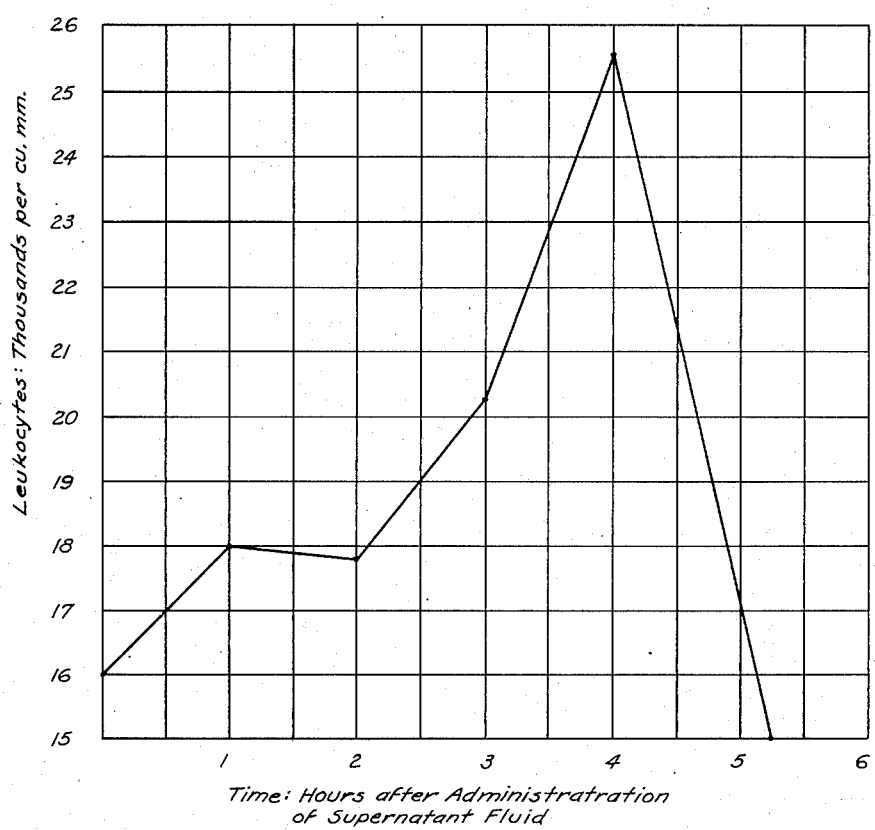
Figure 3:
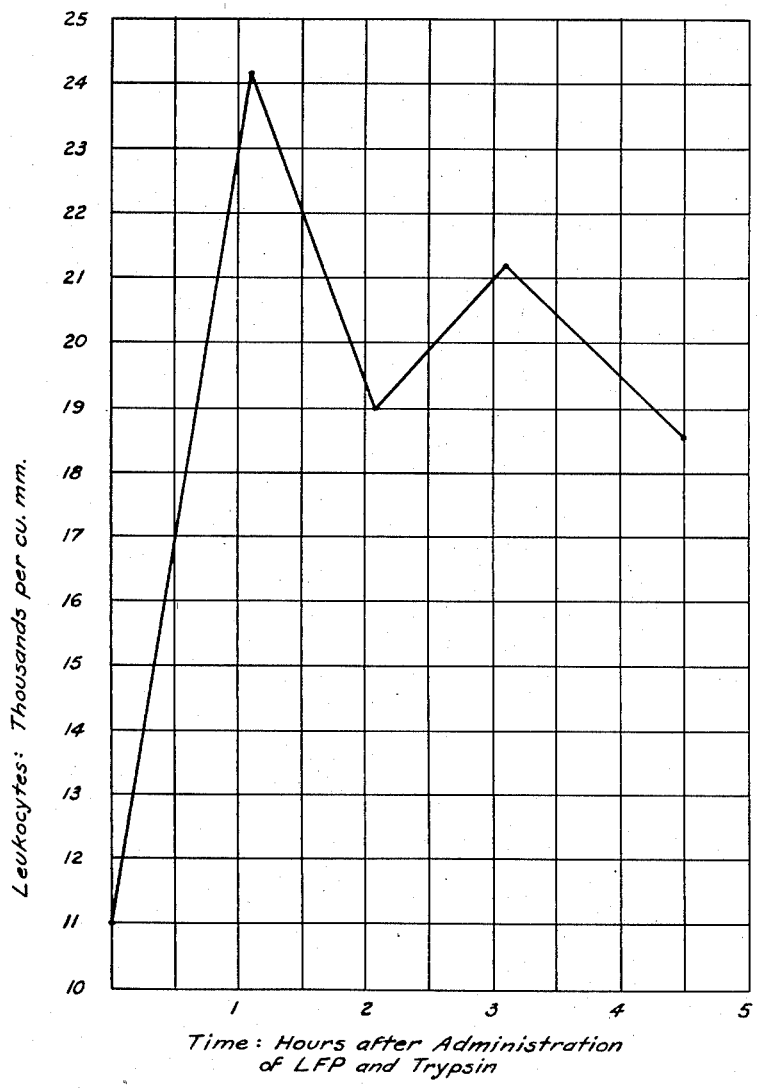
Figure 4:
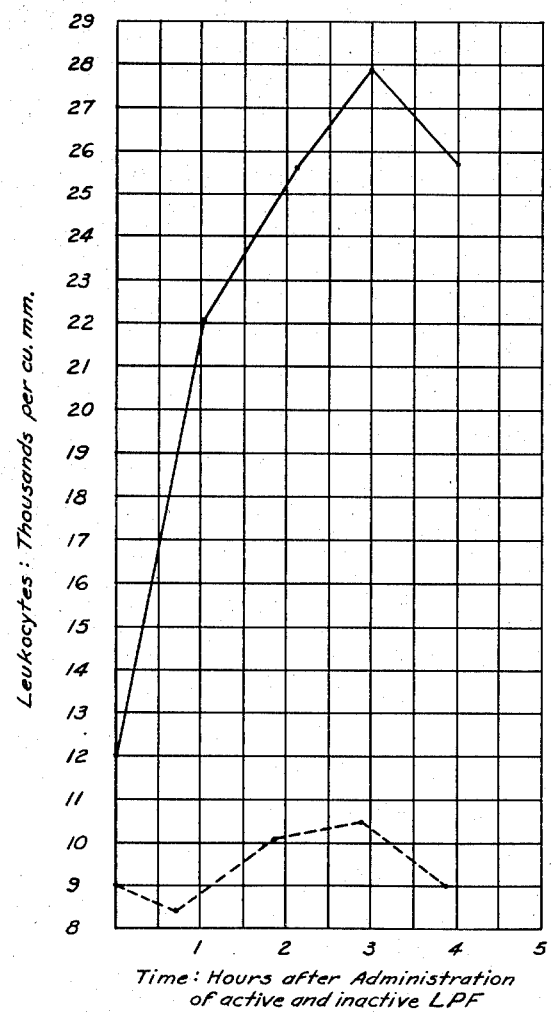
Figure 5:
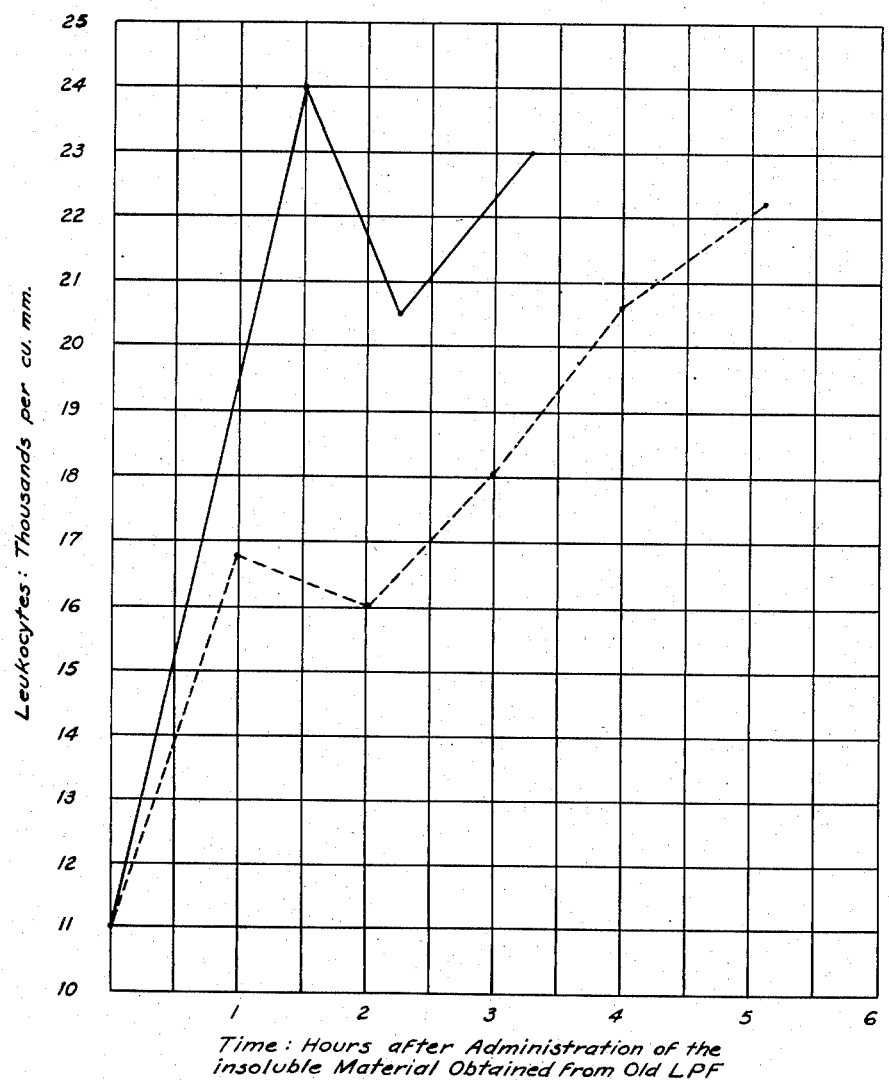

Nov. 20, 1951 V. MENKIN 2,575,763
METHOD FOR PRODUCING THERAPEUTIC PRODUCTS
Filed May 21, 1949 5 Sheets-Sheet 4

Time: Hours after Administration of active and inactive LPF

Patented Nov. 20, 1951

2,575,763

UNITED STATES PATENT OFFICE 2,575,763

METHOD FOR PRODUCING THERAPEUTIC PRODUCT

Valy Menkin, Philadelphia, Pa.

Application May 21, 1949, Serial No. 94,689

1 Claim. (Cl. 167—74)

This is a continuation-in-part of my copending application, Serial No. 714,667 filed on December 6, 1946, now abandoned.

This invention relates to a leukocytosis-promoting factor (LPF) obtained from inflammatory exudates derived from various animal forms, including man, and to processes for the preparation of the same.

It has been known for many years that nucleic acids and their hydrolytic products have an influence on the total white blood cell count of animals. Among the materials which are known to produce leukocytosis, resulting in an increase in the polymorphonuclear leukocytes, are nucleic acids, yeast, nucleic acids from thymus, xanthine, guanine, sodium nucleinate, and the purine bases, adenine sulfate, and guanine hydrochloride. Among the drugs which are known to produce a neutrophilic leukocytosis when injected into animals and man, pentose nucleotide has been found to be useful for the treatment of so-called agranulocytotic angina. Agranulocytosis is a syndrome characterized by a marked decrease in white cells due especially to the disappearance of the granulocytes. This disease is serious and the mortality rate is high. Hence it is obvious that an agent which will promote leukocytosis (the manufacture of white blood cells) is highly desirable as a therapeutic agent for the treatment of agranulocytosis. Also, it is well known that prognosis of a number of pathologic conditions is to a large extent referable to the number of circulating leukocytes. It is, therefore, apparent that the administration of a LPF will prove to be clinically valuable in the treatment of many abnormal conditions wherein the white blood cell content has been reduced, as in anemias such as aplastic anemia, or severe leukopenia.

While pentose nucleotide, which contains the sodium salts of four nucleotides from the ribonucleic acid of yeast, and the other materials mentioned above, have been useful in the treatment of diseases involving a reduction in the number of leukocytes, all of these therapeutic agents have many disadvantages. Among these disadvantages are side reactions encountered from intra-muscular injection of pentose nucleotides. Also effects on the patients following administration, such as chills, fever, a "tight" sensation in the chest, a feeling of tension, and "inner-excitement" followed by lethargy, semi-stupor, and dullness present many difficulties.

In accordance with the present invention, these disadvantages are overcome by a leukocytosis-promoting factor obtained from inflammatory exudates. This factor is essentially a thermolabile, non-dialyzable -2-globulin-associated fraction obtained from the inflammatory exudates which primarily exerts an effect on the hematopoietic tissue in the bone marrow to cause a rise in the number of immature polymorphonuclear leukocytes, said leukocytosis-promoting factor being essentially free from substances having leukopenic activity.

In isolating the leukocytosis-promoting factor from inflammatory exudates, the exudate is treated with a salt, preferably ammonium sulfate, and the precipitate containing undesirable factors from a leukocytosis-promoting standpoint is discarded. Further salt is then added to the remaining supernatant liquid in greater concentration, and the supernatant liquid resulting from further salting out is centrifuged to obtain the leukocytosis-promoting factor.

The object of my invention and the invention itself will be understood by reference to the drawing and to the following description of my improved method, and the product obtained thereby.

Figure 1 of the drawings illustrates the process for the preparation of a leukocytosis-promoting factor in accordance with the example described; Figures 2 to 5 graphically depict number of leukocytes (as thousands per cu. mm.) against time after administration, respectively, of supernatant fluid, LFP and trypsin, active and inactive LPF, insoluble material obtained from old LPF.

The following example will serve to illustrate the invention.

EXAMPLE

Pleural exudation was induced by the injection, under ether anesthesia, of 1.5 cc. of turpentine into the right chest of dogs. Several hours following the injection of the irritant, a sample of the exudate was withdrawn by means of a Luer syringe with a hypodermic needle. The latter was of large caliber and filed off at the end in order to diminish the chance of injury to the lungs.

To the sample of this inflammatory exudate in a beaker is added ammonium sulfate to one-third saturation. The resulting precipitate is discarded and the supernatant liquid is dialyzed until free of sulfate ions. Ammonium sulfate is then added to one-half saturation and the whole is cooled to below 5° C. by remaining in the refrigerator for several days. A precipitate sediments. The clear supernatant phase is then syphoned off or decanted. The sediment which remains is centrifuged. The supernatant phase remains cloudy. This phase is then dialyzed. This material, which has been dialyzed, contains the leukocytosis-promoting factor, is then dried by Dry Ice and desiccated further in vacuo over phosphoric anhydride. The activity of purified LPF can be prolonged by maintaining the active material in the presence of ammonium sulfate on ice. The sulfate ions are dialyzed out prior to use of the material. In this way the LPF can be maintained for weeks in the fluid state on ice. After dialysis, drying by freezing can be employed. Average yield 12.8 milligrams per cc. of exudate.

The pharmacological results of injecting the above material into dogs is described in my publication "The Active Principle in the Leukocytosis-Promoting Factor of Exudates" (Blood, The Journal of Hematology; vol. III, No. 8, August 1948).

Apparently when the LPF obtained by the above process is aged spontaneous denaturation occurs and a relatively inactive and insoluble part is formed. The active principle is split off in the form of a soluble component.

It is clear that when 10 to 20 milligrams of aged LPF (3-6 months old) is treated with about 10 cc. of saline, stirred, and centrifuged, the supernatant part yields considerable activity when injected into dogs. There is an increase of about 64 percent in the number of circulating leukocytes. The data of several such experiments appears in the following Table 1.

TABLE 1

*Effect of a soluble fraction derived from aged LPF (3-6 months old) on the leukocyte level*

| Dog No. | Amount of original LPF from which soluble fraction derived | Basal number of white blood cells | Maximum number of white blood cells within 3-6 hours following administration of material |
|---|---|---|---|
|  | Mg. | Cu. mm. | Cu. mm. |
| 3-T | 10 | 18,850 | 30,250 |
| 3-T | 14.5 | 19,000 | 46,125 |
| 8-D | 14 | 11,000 | 27,175 |
| 5-T | 13.5 | 16,975 | 24,050 |
| 6-T | 14 | 19,000 | 22,250 |
| 8-T | 11.5 | 16,950 | 27,300 |
| 8-T | 17 | 18,700 | 20,100 |
| 9-T | 10 | 16,000 | 25,700 |
| 10-T | 20 | 9,800 | 16,850 |
| 11-T | 20 | 14,700 | 24,450 |
| Average |  | 16,097 | [1] 26,425 |

[1] Percentage increase in leukocyte level=64.2%.

The evidence indicates that the active principle is liberated in toto as a soluble component from the new insoluble and aged sample of leukocytosis-promoting factor. (See Figure 2 of drawings.)

The LPF was extracted from exudates of dogs, as described above. Various quantities of the factor in the fluid state were treated with crystalline trypsin in amounts varying from a mere pinch of the enzyme to 2 milligrams. The length of incubation with the LPF was also variable, lasting from about one hour to over twelve hours. The treated LPF failed to be inactivated by tryptic digestion. The observations are assembled in Table 2. It is quite clear that the addition of trypsin has failed to inactivate the factor. Following such digestion the injection of the treated material still caused a rise of 111.5 percent in the number of circulating leukocytes (Table 2). The course of an experiment is graphically shown in Figure 3 of the drawings.

TABLE 2

*Effect of tryptic digestion on the activity of the leukocytosis-promoting factor*

| Dog No. | Material injected | Basal number of white blood cells | Maximum number of white blood cells within 2-6 hours following injection of treated LPF with enzyme |
|---|---|---|---|
|  |  | Cu. mm. | Cu. mm. |
| 11-T | 13 cc. LPF+pinch crystalline trypsin | 12,100 | 24,600 |
| 12-T | 18 cc. LPF incubated overnight with trypsin | 7,225 | 11,300 |
| 16-T | 20 cc. LPF incubated with trypsin 2 hours | 12,275 | 25,900 |
| 9-T | 18 cc. LPF incubated with trypsin 2 hours | 10,200 | 30,900 |
| 17-T | 17 cc. LPF incubated 2 hours with 2 mgm. trypsin | 6,300 | 8,950 |
| 20-T | 10 cc. LPF incubated 1 hour and 5 minutes with 1 mgm. crystalline trypsin | 10,900 | 24,100 |
| 9-T | 10 cc. LPF incubated 1 hour and 25 minutes with approx. 1 mgm. crystalline trypsin | 10,750 | 21,750 |
| Average |  | 9,964 | [1] 21,071 |

[1] Percentage increase in leukocyte level=111.5%.

When the newly obtained leukocytosis-promoting factor is heated for 30-35 minutes at 100° C., the whole molecule appears to be denatured and the LPF is likewise inactivated. The results of these experiments are summarized in Table 3 below.

TABLE 3

*Effect of heat (at 100° C. for 30-35 minutes) on the activity of the leukocytosis-promoting factor*

| Experiment No. | Amount of LPF used | Basal white cell count in experiment with unheated LPF | Maximum white cell count 3-6 hours following administration of unheated LPF |
|---|---|---|---|
|  | Mg. | Cu. mm. | Cu. mm. |
| 1 | 20 | 8,500 | 17,400 |
| 2 | 19 | 9,425 | 19,500 |
| 3 | 17 | 10,575 | 16,550 |
| 4 | 25 | 11,800 | 27,950 |
| 5 | 23 | 11,000 | 23,250 |
| Average |  | 10,260 | 20,930 |

| Experiment No. | Amount of LPF used | Basal white count in experiment with heated LPF | Maximum white cell count 4-6 hours following administration of heated LPF |
|---|---|---|---|
|  | Mg. | Cu. mm. | Cu. mm. |
| 1 | 20 | 9,375 | 9,550 |
| 2 | 19 | 7,350 | 8,350 |
| 3 | 17 | 8,825 | 8,400 |
| 4 | 25 | 9,425 | 10,600 |
| 5 | 23 | 13,275 | 14,150 |
| Average |  | 9,650 | 10,210 |

Percentage increase in leukocyte level with unheated LPF=104%.
Percentage increase in leukocyte level with heated LPF=6%.

When the LPF is exposed to a temperature of 100° C. the material is completely inactivated. The LPF now yields a rise of 6 percent in the number of circulating leukocytes in contrast to its original activity of 104 percent. (See Figure 4 of the drawings.)

When on the contrary, the active supernatant or soluble fraction obtained from aged LPF is evaporated to dryness on a steam bath, its activity remains essentially intact. Evaporation of the active supernatant material over a steam bath fails to inactivate the principle. The results of these experiments are collected together in Table 4 below.

TABLE 4

*Effect of the soluble fraction derived from aged LPF when evaporated to dryness on steam bath and also when that dried fraction is boiled for 30–40 minutes*

| Dog No. | Amount of dried supernatant material derived from aged LPF injected into heart | Basal white cell counts | Maximum white cell count following administration of either evaporated material derived from aged LPF or following boiling of such evaporated dried material |
|---|---|---|---|
| | Mg. | Cu. mm. | Cu. mm. |
| 9-T | | 7,625 | 17,500 |
| 11-T | | 11,050 | 24,200 |
| 16-T | 10 | 9,350 | 20,650 |
| 29-T | 20 | 12,950 | 18,400 |
| Average | | 10,244 | [1] 20,188 |
| 9-T [2] | 20 | 13,500 | 20,350 |
| 11-T [2] | 23 | 11,575 | 22,100 |
| 39-T [2] | 28 | 14,750 | 43,050 |
| Average | | 13,275 | [3] 28,500 |

[1] Percentage increase in leukocyte level = 97.1%.
[2] The evaporated material to dryness has in addition been subjected to boiling for 30–40 minutes.
[3] Percentage increase in leukocyte level = 114.7%.

When such brittle, dried material obtained by evaporation over a steam bath is heated for 30–40 minutes at 100° C., the active principle fails to be inactivated. (See Table 4.) The active supernatant material when evaporated to dryness forms brittle flakes which are insoluble in an aqueous medium. Heating again to 100° C. such insoluble material fails to decrease its potency. Its injection in dogs induces a rise of 114.7 percent in the level of circulating leukocytes. This observation definitely indicates that the LPF can be recovered from aged exudates as a highly thermostable substance. The results of these experiments appear in Figure 5 of the drawings.

Polypeptides are known to be highly thermostable. For this reason the amino acid nitrogen before and after hydrolysis was determined on several samples of the active supernatant phase from an aged sample of LPF. The measurements of such samples indicate in each case a rise in the amino acid nitrogen following acid hydrolysis. The figures obtained on such samples before and after hydrolysis are listed in Table 5 below. These observations suggest very strongly that the active principle is a relatively simple polypeptide.

TABLE 5

*The amino nitrogen content in the active principle of the LPF before and after hydrolysis*

| | Before Hydrolysis | After Hydrolysis |
|---|---|---|
| | Mg./cc. | Mg./cc. |
| Colorimetric method (modified O. Folin method, J. Biol. Chem. 118; 321, 1937) | 0.09 | 0.2 |
| | 0.15 | 0.37 |
| | 0.16 | 0.51 |
| | 0.22 | 1.00 |
| Average | 0.155 | 0.520 |
| Copper method (method of A. A. Albanese and V. Irby, J. Biol. Chem. 153; 585, 1944) | 0.009 | 0.066 |
| | 0.009 | 0.053 |
| | 0.009 | 0.095 |
| | 0.026 | 0.106 |
| Average | 0.013 | 0.080 |

The example given above is intended to illustrate the invention without limiting it to the exact materials, proportions, and conditions described therein. In the example given, two fractionations of the exudate are made to obtain the LPF. By the use of this procedure optimum yields of LPF are obtained. However, it is to be understood that LPF can also be obtained by procedures which involve further fractionations.

The LPF, when injected into man causes an increase in the number of circulating leukocytes extending over a period of many hours. Results of these experiments are shown in a paper published in the Archives of Pathology; April 1946 (page 379 and elsewhere throughout the article).

What I claim is:

A process for the isolation of a leukocytosis-promoting factor from inflammatory animal exudates which comprises fractionating the exudates with ammonium sulfate to one-third saturation, discarding the resulting precipitate, dialyzing the resulting supernatant liquid until free of sulfate ions, adding ammonium sulfate to one-half saturation, cooling, siphoning off the albumin which is a clear supernatant phase and collecting the unsettled part of the precipitate, centrifuging the supernatant containing unsettled precipitate and discarding the precipitate which settles, dialyzing the unsettled precipitate until free of sulfate ions, and drying the dialyzed material in vacuo.

VALY MENKIN.

REFERENCES CITED

The following references are of record in the file of this patent:

UNITED STATES PATENTS

| Number | Name | Date |
|---|---|---|
| 2,161,861 | Gerlough | June 13, 1939 |
| 2,246,355 | Gerlough | June 17, 1941 |

OTHER REFERENCES

Menkin in Am. J. Path. 19, pp. 1021–1027, Nov. 1943.

Am. J. Med. Sci. 205, pp. 363–368, Mar. 1943.

Proc. Soc. Exptl. Biol. Med. 56, pp. 219–220, June 1944.